Figure 1:
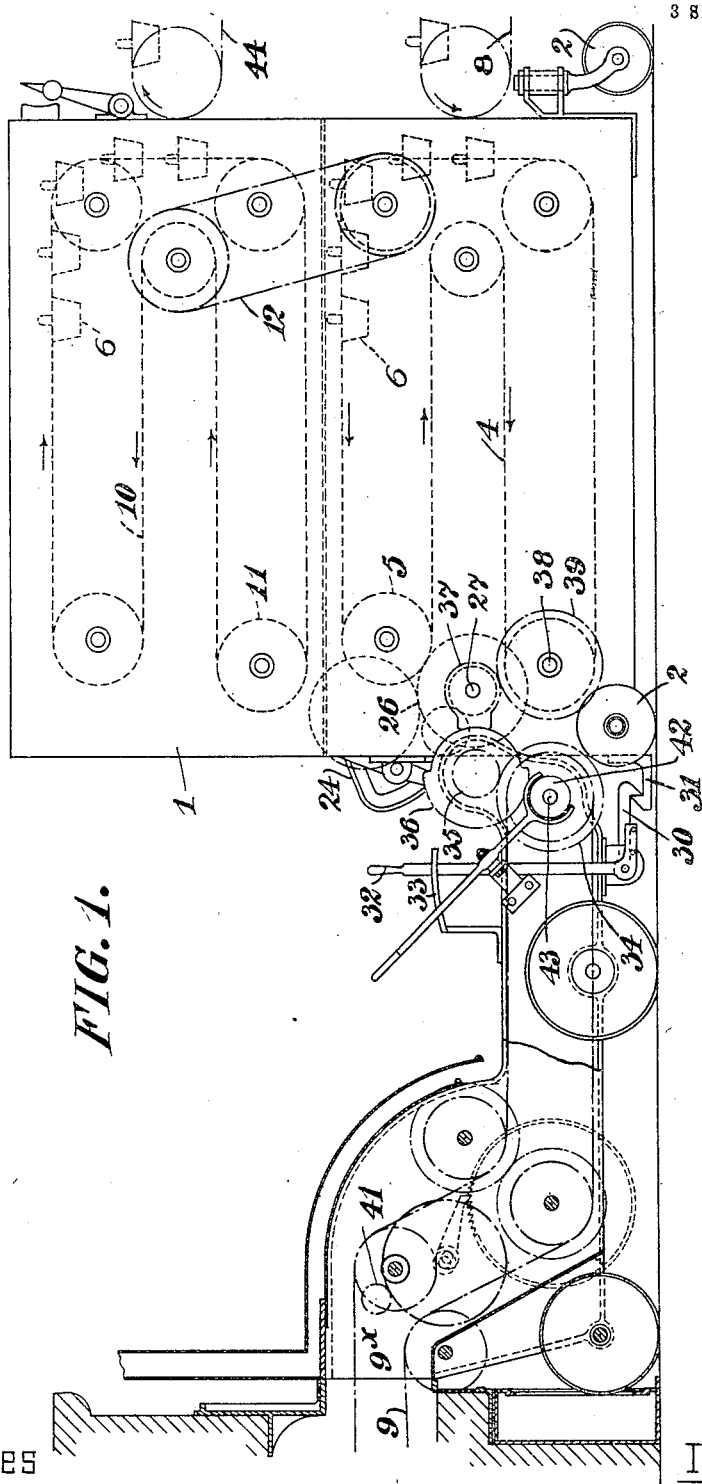

G. LUNT.
APPARATUS FOR BREAD MAKING AND THE LIKE.
APPLICATION FILED JUNE 12, 1913.

1,118,030.

Patented Nov. 24, 1914.

3 SHEETS—SHEET 1.

Witnesses
Grace P. Brereton
Mary D. Smoot

Inventor
George Lunt
By Sturtevant Mason
Attys.

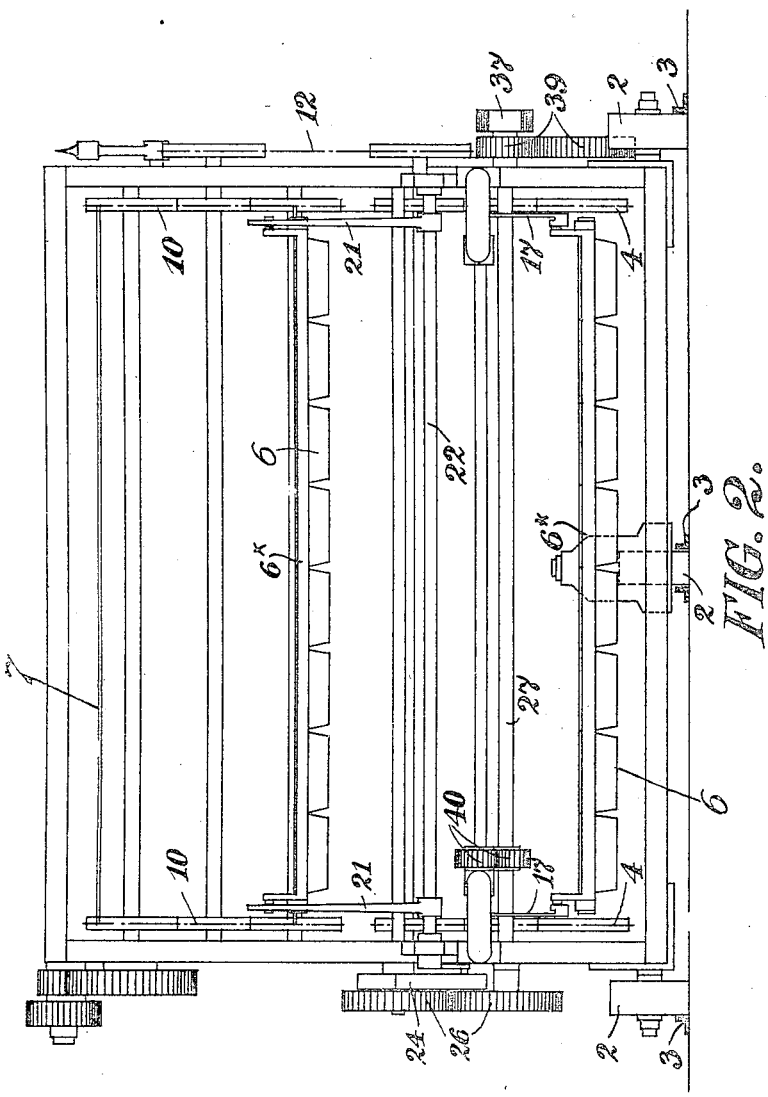

G. LUNT.
APPARATUS FOR BREAD MAKING AND THE LIKE.
APPLICATION FILED JUNE 12, 1913.
1,118,030.
Patented Nov. 24, 1914.
3 SHEETS—SHEET 3.
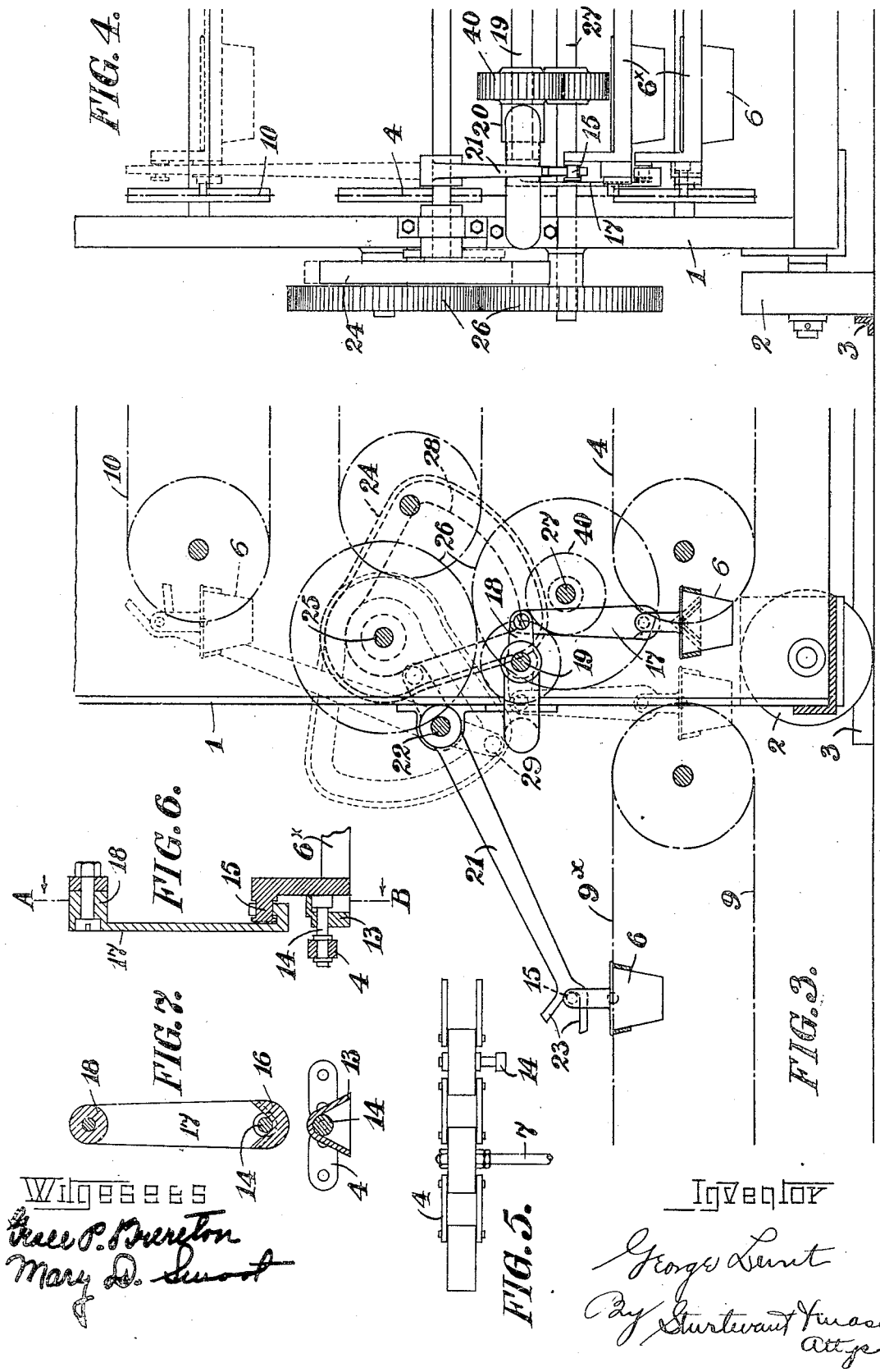

UNITED STATES PATENT OFFICE.

GEORGE LUNT, OF FORMBY, ENGLAND.

APPARATUS FOR BREAD-MAKING AND THE LIKE.

1,118,030. Specification of Letters Patent. Patented Nov. 24, 1914.

Application filed June 12, 1913. Serial No. 773,278.

*To all whom it may concern:*

Be it known that I, GEORGE LUNT, subject of the King of Great Britain, residing at Formby, in the county of Lancaster, in the Kingdom of England, have invented certain new and useful Improvements in Apparatus for Bread-Making and the like, of which the following is a specification.

This invention has reference to bakery and like plants, and has for its object to provide a machine for the mechanical transport and automatic delivery of the dough loaves from the molding machine to the baking oven, and of the baked loaves from the baking oven to the bread room or other place of storage, also to arrange for the effective proving and (or) cooling of the dough loaves and baked loaves respectively, so that manual labor is dispensed with, as much as possible.

The invention is of the class in which the molded dough portions are discharged from the molder, on to one of the tiers of the prover conveyer, the delivery end of which delivers the dough portions on to the continuously or intermittently moving conveyer of a baking chamber, the rate of whose motion is such that the time occupied in transversing the chamber is that required for baking; and then when the baking is completed a conveyer receives the baked loaves from the baking chamber and passes them to the bread room where they are placed on the storage shelves. In apparatus of this class, the continuous prover and the continuous oven have hitherto formed substantially one machine, and it was impossible to separate them without dismantling the parts, and furthermore at the entrance end of the baking chamber the prover conveyer projected thereinto, for the purpose of enabling the dough portions after proof to be picked up by the synchronously moving conveyer of the oven which traversed the same in tiers in a zigzag manner, while the unloaded prover conveyer continued its journey around the outside of the oven to the opposite side where it received the baked loaves from the exit aperture of the oven and then after passing through the bread room for the discharge of its contents, returned to the prover again. This arrangement in my view was disadvantageous in that among other things, the entrance and exit apertures of the oven were so obstructed by the prover chains, that it was impossible for anyone to obtain access to the oven through those apertures for the purpose of repairs, etc., and furthermore easy removal of the continuously or intermittently moving conveyer of the oven through the entrance or exit aperture was absolutely impossible.

Now according to the present invention the apparatus for transporting the dough portions from the molder to the baking chamber and proving them during transit, and for transporting the baked loaves to the bread room, is an altogether separate apparatus from the oven, so that it can be moved clear of the oven to permit of access being had to the entrance aperture thereof, and (or) to give space for the continuously or intermittently moving conveyer of the baking chamber to be drawn out. The said apparatus is characterized in that the guide pulleys around which the conveyer passes in a zigzag or circuitous course, are mounted in a framework or carriage, which rests on the bakehouse floor, so that while for the time being it is a fixture thereon, yet it can be moved if required clear of the oven aperture to permit of access being had to the oven, or to allow space for the moving conveyer of the baking chamber to be drawn out, or if desired such carriage may be provided with wheels so that it can be run along the bakehouse floor but be fixed for the time being in the position required.

The invention is further characterized in that the said carriage is provided with a second set of guide pulleys around which a second conveyer passes, for the automatic delivery of the baked loaves from the baking chamber to the bread room.

The invention is also characterized by the provision of certain improvements in the transferring mechanism for the automatic charging and discharging of the baking chamber.

These and other improvements will be understood from the following description reference being had to the accompanying drawings, in which—

Figure 1 is a sectional side elevation of my apparatus for the mechanical transport and automatic delivery of the dough loaves from the molding machine to the oven and of the baked loaves from the oven to the bread room or other place of storage, also for the effective proving and cooling of the dough loaves and baked loaves respectively. Fig. 2 is an end elevation thereof. Fig. 3 is an enlarged sectional side elevation of part of the said machine. Fig. 4 is a part end view. Fig. 5 is a plan view of a fragment of one of the conveyer chains. Fig. 6 is a detail sectional view of part of the device for transferring the receptacles from the prover to the oven; and Fig. 7 a sectional face view on line A B of Fig. 6.

Referring to the drawings, 1 is the device for transporting the dough loaves from the molder to the oven, and the baked loaves from the oven to the place of storage, this device being altogether separate from the oven. It comprises endless conveyer chains 4 adapted to run around guide pulleys 5 mounted in a framework or carriage 1 which rests on the bakehouse floor, so that while for the time being it is a fixture thereon, yet it can be moved if required clear of the oven, which is of the type having endless chains or conveyers supporting trays or receptacles for containing the dough portions or other like articles to be baked. If desired however such carriage may be provided with wheels 2 so that it can be run along the bakehouse floor. The conveyer chains are spaced apart by stay rods 7, and arranged to enable the tins or receptacles 6 to be suspended at intervals between them. The stay rods are omitted from Fig. 2 to avoid obscuring the construction of the machine. In order to allow time for the dough portions to prove during transit from the molder to the oven without driving the chains 4 at an inconveniently slow rate, the conveyer chains are of the type which take a circuitous course, the guide pulleys 5 being arranged accordingly. The framework or carriage 1 may be inclosed as completely as possible if desired especially if it is required to allow the dough pieces to prove in a humid atmosphere.

The dough loaves as they are delivered from the molder, are passed into tins or receptacles 6 which are conveyed by a carrier 8 shown in dotted lines, or in other known manner to the conveyer chains 4 of the transporting device, the loaded receptacles 6 being transferred from the carrier to the conveyer chains 4. The conveyer chains 4 being in intermittent motion, they slowly convey the dough pieces to the discharge end of the transporting device, and during the circuitous passage the said pieces have time to prove. The loaded receptacles 6 as they reach the discharge end are freed in turn automatically from the endless chains 4, and transferred to the oven by a transferring device, the oven being of the type in which the loaves are passed into the chamber by an endless conveyer 9, the empty portions of the endless carrier of the oven being in turn brought into position to receive the loaded receptacles.

If the transporting device is arranged with wheels 2 it may be run along the bakehouse floor either on rails or between chocks or guides 3, so that it can be guided into the exact position required to receive the dough pieces from the molder, in which case a carrier such as 8 for conveying the loaded receptacles to the conveyer chains 4, would not necessarily be required, as the frame or carriage 1 would form a vehicle which would be wheeled to the molder to receive the loaded tins therefrom. Then when the transference of the dough pieces to the molder is completed, the transporting device is wheeled along the floor of the bakery to the oven, and the loaded receptacles 6 as they reach the discharge end, are freed in turn automatically from the endless chains 4, and transferred to the endless carrier 9 of the oven by a transferring device, which device will be presently described. The movements of the two conveyers 4 and 9 synchronize.

The oven carrier is formed of two or more endless conveyer chains 9 spaced apart by stay rods to receive the receptacles between them. The lower run 9 of this carrier carries the receptacles into the oven, and the upper run 9$^x$ carries them back again, the dough pieces being baked by the time they reach the front of the oven again. Here the receptacles are in turn, by means of another transferring device, freed from the oven carrier, and are transferred to endless conveyer chains 10 in another part of the transporting device 1 which moves in a direction opposite to that of the conveyer 4. These also pass around guide pulleys such as 11 driven from one of the guide pulleys 5 by the driving chain 12. Then when the transference of the receptacles containing the baked bread from the oven is completed, the transporting device 1 if mounted on wheels is wheeled away to the bread room, and the loaded receptacles are discharged of their contents, but before discharge, the loaves are allowed by the slowly moving conveyer 10, to cool. Or if the transporting device is without wheels, then from the exit end of the transporter the receptacles 6 with the baked loaves in them are transferred to the carrier 44, which passes to the bread room where the receptacles are taken off the carrier 44, the bread removed, and the receptacles returned to the carrier 8, so as to complete their circuit. In conjunction with the endless conveyer chains 10, active cooling agencies may be employed. In this way the goods can be transferred from the molder to oven, and proved during their transit, and then when baked transferred from the oven to the bread room, and cooled during their passage thereto, and thus great economy of hand labor is effected.

The receptacles 6 are preferably assembled together into batteries or rows of receptacles, for instance, each battery may be composed of one row of receptacles all supported in a single holder 6ˣ, each receptacle in a row being adapted to contain a portion to be baked, and each battery is pivotally suspended between the chains 4 by means of sockets or cradles 13 on the holder 6ˣ adapted to engage pins 14 on the chains 4. The molder is adapted to deliver the same number of dough pieces at each operation that the row of receptacles 6 is designed to hold.

The device for transferring each loaded battery from the conveyer 4 to the conveyer 9 is as follows: On arriving at the discharge end of the transporting device 1, each loaded battery is in turn automatically arrested in its travel by pins 15 on the receptacles coming into contact with trip cradles 16 at the end of a link 17 hanging freely from the end of a crank arm 18, keyed on the rotary shaft 19, which is journaled in bearings 20 carried in the frame of the transporting device 1. The rotation of the shaft 19 is intermittent, and the trip cradles 16 normally lie in the path of the pins 15 at the ends of the battery of receptacles. On a battery of receptacles entering the cradles 16, the shaft 19 rotates, and so lifts the battery off the pins 14 of the chain 4 and swings it into such a position that its sockets 13 engage similar pins in the oven carrier 9, while cradles 16 (now empty) complete their revolution and come to rest in position ready to receive the next battery from the chains 4.

The devices for effecting the transference of the receptacles from the carrier 8 to the conveyer 4, and from the conveyer 10 to the carrier 44 are similar to the above.

In the embodiment shown the means for effecting a transference of the baked loaves from the oven carrier 9ˣ to the chains 10 of the transporting device, consists of the arms 21 keyed to the shaft 22 and adapted to swing in the segment of a circle. These arms have splayed forks 23 at the ends, which normally lie in such a position, that the pins 15 on the batteries when they arrive at the front of the oven again, automatically enter these forks, and simultaneously the arms are turned so as to elevate the batteries into the position shown by the dotted lines Fig. 3, so that they take up a position between the chains 10, and are engaged by pins on the said chains coming into contact with the sockets 13. The pins in the chains 10 lift the battery out of the forks 23 and carry it forward to the other end of the carriage 1. It will be evident that the swing of the arm can be effected in many ways, but in the example shown in the drawing, this swing is effected by a rotary member 24 keyed to a rotary shaft 25, driven by gearing 26, from the shaft 27, said rotary member having a cam slot 28 in which a pin 29 on the arm enters, so that the rotation of the member 24 will swing the arm 21 upward into the upstanding position and then swing it back again ready to receive another receptacle or battery of receptacles.

In order that the transporting device 1 if mounted on wheels, may be held a fixture in the exact position required for the receptacles 6, to be transferred from the chains 4 to the oven conveyer chains 9, and from the oven conveyer chains to the conveyer chains 10, the said transporting device is locked to the oven front by means of the clawed arms 30 on the oven front, engaging the clawed bracket 31 on the device 1. The clawed arms 30 are operated by the hand lever 32 working in a segment 33 by which the clawed arms 30 may be held in the locked or unlocked position.

The endless chains 4 are driven intermittently from the endless conveyer chains 9 of the oven by the gear wheels 34 and 35 which latter drives the mutilated wheel 36 which at intervals drives the mutilated pinion 37. This at intervals drives the shaft 27 which by means of the gear wheels 39 drives one of the guide pulleys 5 on the shaft 38, this shaft giving motion to the conveyer chains in the frame 1, while the shaft 27 gives motion to the shaft 19 by the pinions 40. Thus an intermittent motion is imparted to the shaft 38 and consequently to the chains 4 and 10 with their suspended receptacles, and as therefore the oven chains 9 travel more quickly than the chains 4 and 10, the receptacles are spaced apart less closely on the oven chains than on the chains 4 and 10. All the moving parts are properly timed and arranged to act in harmony as they have one prime mover in common, as for instance the gear wheel 41 driven by some suitable source of power. The gear wheel 41 drives the conveyer chains 9 of the oven through suitable gearing.

42 is a clutch on the shaft 43 of the oven conveyer chain wheels, to throw the shafts 27 and 38 of the frame 1, into and out of gear with the oven conveyer chains 9 as required.

An example of a very suitable arrangement of traveling conveyer for the oven or baking chamber, is described in specification, Serial No. 773,277, wherein the pulleys for the conveyer are mounted upon a carriage, such carriage being adapted to be slid or moved bodily out of the oven chamber when required for cleaning purposes or repairs, or run back again into position for use. To allow for said carriage to be run out of the oven chamber, it is essential that the transporting device be capable of being moved clear of the oven aperture to give the necessary free space. The transporting device 1 being an altogether separate apparatus from the oven, allows for this. In the arrangement hereinbefore described and illustrated, the delivery of baked goods is effected at the same end of the oven and at or about the same point, as that at which charging takes place. While I consider this is undoubtedly the best arrangement in connection with automatic charging and discharging of the oven, yet it must be understood that I do not limit myself to this, as if desired there may be a charging opening at one end of the oven chamber, and a discharging opening at the other end, in which case the oven carrier is arranged to project out at both ends of the oven chamber. An example of such an arrangement is described and shown in my specification aforesaid, Serial No. 773,277. An arrangement of this kind would not involve a departure from the scope of the invention herein set forth, and it might be more convenient, in this case to use two transporting devices, one for transferring the unbaked dough to the entrance end of the oven, and effect the proving thereof, and the other for transferring the baked bread from the delivery end of the oven.

By my present invention hand manipulation is avoided, and the uniformity and certainty incident to machine work results, is insured.

I declare that what I claim is:—

1. In a bakery or like plant, a transporting apparatus comprising a framework or carriage, one set of guide pulleys mounted therein for the circuitously arranged conveyer that transports the dough charges to the continuously or intermittently moving conveyer of a baking chamber, and a second set of guide pulleys around which a second conveyer passes, for the automatic delivery of the baked loaves from the continuously or intermittently moving conveyer of a baking chamber to the bread room.

2. In a bakery or like plant, the combination comprising a frame or carriage, endless traveling conveyer chains carried by the guide pulleys therein, receptacles supported by the said chains, said chains traveling in opposite directions and being passed around guide pulleys, in such manner that they form two sets of carriers, one for the mechanical conveyance and proving of the dough portions and their automatic delivery to the continuously or intermittently moving conveyer of an oven, and the other for the automatic delivery from the continuously or intermittently moving conveyer of an oven and mechanical conveyance and cooling of the baked portions to the place of storage.

3. A bakery or like plant of the class referred to, comprising a continuous oven, guide pulleys therein, a carriage, endless traveling conveyer chains carried by guide pulleys, receptacles for the dough charges, supported by the said chains, and mechanism embodying crank arms and trip cradles hung therefrom arranged and adapted when the receptacles come into proximity to the cradles to turn about their axis, so as to automatically detach such receptacles from the chains of the carriage and deposit them on the advancing oven or baking chamber chains.

4. A bakery or like plant of the class referred to, comprising a continuous oven, a carriage, guide pulleys therein, endless traveling conveyer chains carried by the guide pulleys, receptacles for the charges carried by the oven or baking chamber chains, and mechanism embodying arms adapted to swing in the segment of a circle, and having forks at their ends which when the receptacles come into proximity to the forks are arranged and adapted to turn about their axis so as to automatically detach such receptacles from the chain of the oven, and deposit them on the advancing chains of the carriage.

In witness whereof, I have hereunto signed my name this 4th day of June, 1913, in the presence of two subscribing witnesses.

GEORGE LUNT.

Witnesses:
G. C DYMOND,
F. S. SHILLINGTON.